United States Patent [19]

Young

[11] Patent Number: 5,199,967
[45] Date of Patent: Apr. 6, 1993

[54] FOLIAR FERTILIZATION METHODS

[75] Inventor: Donald C. Young, Fullerton, Calif.

[73] Assignee: Union Oil Company of California, Los Angeles, Calif.

[21] Appl. No.: 160,812

[22] Filed: Feb. 26, 1988

Related U.S. Application Data

[63] Continuation-in-part of Ser. No. 458,277, Jan. 17, 1983, abandoned.

[51] Int. Cl.$^5$ .......................... C05B 7/00; C05D 5/00
[52] U.S. Cl. ................................. 71/34; 71/61; 71/64.1; 71/904; 71/DIG. 1
[58] Field of Search .................. 71/34, 61, 64.1, 904, 71/DIG. 1

[56] References Cited

U.S. PATENT DOCUMENTS

| Re. 20,360 | 5/1937 | Rosenstein | 71/1 |
|---|---|---|---|
| 77,810 | 8/1867 | Ramsburgh | 54/7 |
| 1,951,742 | 3/1934 | St. John | 71/61 |
| 1,963,711 | 6/1934 | Mitteau | 71/61 |
| 1,969,180 | 8/1934 | Harvey | 131/70 |
| 2,061,534 | 11/1936 | Balz et al. | 71/61 |
| 2,140,340 | 12/1938 | Vogel | 71/61 |
| 2,802,307 | 8/1957 | Belasco et al. | 47/58 |
| 3,114,624 | 12/1963 | Smith et al. | 71/64.03 |
| 3,148,970 | 9/1964 | Smith et al. | 71/54 |
| 3,441,400 | 4/1969 | Otrhalek | 71/54 |
| 3,558,300 | 1/1971 | Wagner | 71/34 |
| 3,617,240 | 11/1971 | Scott | 71/29 |
| 3,918,952 | 11/1975 | Neumiller | 71/28 |
| 4,007,029 | 2/1977 | Kenton | 71/11 |
| 4,013,446 | 3/1977 | Beresky et al. | 71/86 |
| 4,033,746 | 7/1977 | Young | 71/30 |
| 4,214,888 | 7/1980 | Young | 71/28 |
| 4,321,079 | 3/1982 | Ott | 71/61 |

OTHER PUBLICATIONS

Kirk-Othmer, Encyclopedia of Chemical Technology, Third Ed., 10, John Wiley & Sons, New York, pp. 80 and 81 (1980).

Montclaro et al, "Effect of Magnesium Sulfate on the Rate of Absorption of Urea by Tomato Leaves" Proe. Amer. Soc. Horticult. Sci., V 62, 1953, pp. 363-366.

Primary Examiner—Ferris Lander
Attorney, Agent, or Firm—Michael L. Laird; Yale S. Finkle; Gregory F. Wirzbicki

[57] ABSTRACT

Aqueous solutions useful as foliar fertilizers contain ammonium ion, at a phytotoxic concentration, and sufficient magnesium ion to minimize the phytotoxic effect of the ammonium ion when the solution is applied to plant foliage. Also provided is a method for foliarly fertilizing plants sensitive to ammonium ion with ammonic nitrogen-containing fertilizers which method comprises applying magnesium ion to the plant foliage either prior to, simultaneously with or after application of the ammonic fertilizer to reduce the sensitivity of the plants to ammonium ion.

10 Claims, No Drawings

FOLIAR FERTILIZATION METHODS

RELATED APPLICATIONS

This application is a continuation-in-part of my co-pending application Ser. No. 458,277 filed Jan. 17, 1983 for FOLIAR FERTILIZATION METHOD AND COMPOSITION and now abandoned.

BACKGROUND OF THE INVENTION

1. Field of the Invention

The invention relates to a method for foliar fertilization of plants, especially legumes, with ammonium ion and to a novel composition useful therein.

2. Background of the Art

Aqueous fertilizer solutions comprising urea as the source of nitrogen have been extensively utilized for foliar fertilization and have found significant commercial acceptance. However, commercial grades of urea include varying, low concentrations of ammonium ion, and aqueous solutions of commercial urea may decompose at a low pH to generate ammonium ion in situ. It is also well known that ammonium ion, an alternative and cheaper source of fertilizer nitrogen, may cause phytotoxic damage to many plants. Thus, liquid fertilizers do not utilize ammonium ion as a major source of nitrogen and the urea based liquid fertilizers are treated by methods which minimize the ammonium ion content thereof to prevent phytotoxic damage. For example, see U.S. Pat. No. 4,214,888.

In fact, methods of fertilizing conifer forests include utilizing the phytotoxic effect of urea and ammonium nitrate based liquid fertilizer combinations to thin conifer forests so that only the most healthy trees can survive. See for example, U.S. Pat. No. 4,033,746. This reference also mentions that various micronutrients such as iron, molybdenum, manganese, copper, boron, zinc and magnesium may be included as water soluble salts in the aqueous fertilizer solutions disclosed. Since micronutrients by definition function at very low amounts, the amounts included will necessarily be small. Moreover, conifers are not generally found to be as sensitive to the phytotoxicity of ammonium ion as certain other plants, such as legumes. Therefore, the inclusion of magnesium ion in such aqueous fertilizing solutions is for the purpose of providing micronutrients as opposed to reducing the phytotoxic effect of the ammonium ion.

It is well known that many liquid fertilizers which include ammonium ion as a minor nitrogen source can also include micronutrients such as the above mentioned. In U.S. Pat. No. 3,918,952, a composition useful as a liquid fertilizer for lawns is disclosed. However, the concentration of the ammonium ion is not sufficient to cause a phytotoxic reaction of the usual lawn grasses.

Solid fertilizers are known in the art which combine an ammonium ion-containing salt with alkaline earth metal compounds. For example, in U.S. Pat. No. 2,061,534 ammonium chloride is disclosed in combination with magnesium carbonate. There is no teaching that this material is useful as a liquid fertilizer, and there is no suggestion that the amount of magnesium is critical to control the phytotoxicity of the ammonium ion. Moreover, since this material is to be applied as a solid, there will be no danger of the ammonium ion harming the plant during its inevitable slow release into the soil.

It is, therefore, one object of this invention to provide a method for reducing the phytotoxicity of liquid fertilizers comprising ammonium ion.

It is another object to provide ammonium ion-containing foliar fertilizers wherein the phytotoxicity of the ammonium is reduced.

Another object is to provide an ammonium ion-containing liquid fertilizer suitable for use on legumes, such as beans, alfalfa, etc.

Additional objects, advantages and aspects of the invention will become apparent to those skilled in the art from the following disclosure and the appended claims.

SUMMARY OF THE INVENTION

The instant invention resides in an aqueous solution for the foliar fertilization of plants, especially legumes, which comprises: (a) a nitrogen source comprising ammonium ion at a phytotoxic concentration, and (b) magnesium ion in an amount relative to said ammonium ion sufficient to reduce the phytotoxicity of said ammonium ion when said solution is applied as a foliar fertilizer. The invention also provides, as a composition of matter, an aqueous solution for foliar fertilization of plants consisting essentially of: (a) ammonium ion; and (b) an amount of magnesium ion sufficient to reduce the phytotoxic effect of said ammonium ion when said solution is applied as a foliar fertilizer.

Another embodiment of the instant invention involves a method of fertilizing plants with nitrogen-containing compounds which comprises applying to the foliage of said plants, as an aqueous solution, a water soluble nitrogen source comprising ammonium ion at a phytotoxic concentration, and contacting the foliage of said plant with magnesium ion in an amount sufficient to reduce the phytotoxic effect of said ammonium ion.

In the method of the instant invention, magnesium ion can be provided to the foliage of the plant either prior to, simultaneously with, or after the application of the aqueous ammonium ion-containing solution. It has unexpectedly been discovered that the application of magnesium ion about one day prior to the application of the ammonium ion-containing solution results in somewhat less phytotoxic damage or leaf burn to legumes. However, for convenience and economy, the magnesium ion is usually applied at the same time as the ammonium ion, i.e., as a single solution comprising ammonium ion in combination with magnesium ion.

DETAILED DESCRIPTION OF THE INVENTION

It has now been found that the phytotoxicity of foliarly-applied ammonium ion is due to interference of ammonium ion with magnesium utilization by the plant. This is found to be especially severe when leguminous plants such as soy beans, peanuts, peas and alfalfa are fertilized with aqueous fertilizer solutions comprising ammonium ion. Thus, foliar damage to legumes has been observed with ammonium phosphate fertilizers which are known to cause little or no foliage desiccation on most species of plants.

It is also found that foliar damage is more likely when ammonium ion is applied to the foliage of plants as an aqueous solution as opposed to topically applying a solid fertilizer comprising ammonium ion. The various solid fertilizers comprising ammonium ion provide ammonium ion at a continuous, low concentration as the solids dissolve in the soil. The ammonium ion is then fixed by the soil and becomes available to the roots of the plant only after conversion to nitrate. Therefore, the plant is not exposed to significant amounts of ammonium ion.

Thus, in one aspect, the instant invention provides a method of fertilizing plants by applying to the plant foliage an aqueous solution of water-soluble nitrogen source comprising ammonium ion at a phytotoxic concentration, and contacting the foliage with magnesium ion in an amount sufficient to reduce the ammonium ion phytotoxicity. Preferably, the magnesium ion is applied as an aqueous solution, and more preferably, in the aqueous solution containing the ammonium ion.

Another embodiment of the invention provides, as a novel composition of matter, an aqueous solution for foliar fertilization of plants, especially legumes, which comprises: (a) a nitrogen source comprising ammonium ion at a phytotoxic concentration, and (b) magnesium ion in an amount relative to the ammonium ion sufficient to reduce the ammonium ion phytotoxicity when applied as a foliar fertilizer. The solution may comprise at least about 1 percent, by weight, nitrogen as a water-soluble ammonium compound, e.g. ammonium salt, such as ammonium chloride, ammonium sulfate, ammonium phosphate, etc. Additional nitrogen may be provided by other water-soluble nitrogen compounds such as urea, alkali and alkaline earth metal nitrates, ammonium nitrate, etc. The concentration of nitrogen in the foliar fertilizer is preferably maximized to avoid the economic debit of transporting and handling more than the minimum amount of water necessary to dissolve the nitrogen and magnesium sources. Therefore, the foliar fertilizer may comprise up to about 40 percent, by weight, nitrogen. Preferably, such aqueous solutions contain sufficient ammonium ion to provide more than 50 percent of the total nitrogen and, more preferably, ammonium ion is the sole source of nitrogen to take advantage of the economy of using ammonium salts as a fertilizer.

Magnesium ion may be provided in precursor form as any water-soluble magnesium salt or chelate. Specific examples include magnesium chloride, magnesium nitrate, magnesium citrate, the polyphosphate or ethylene diamine tetraacetic acid complexes of magnesium, etc. The amount of magnesium in the solution is usually selected to provide a foliar fertilizer which will not damage plants when applied to the foliage thereof. That is, it is preferred that sufficient magnesium ion be provided to substantially minimize or eliminate phytotoxic damage.

Different plants have different amounts of magnesium incorporated therein. Therefore, depending on which plants are to be fertilized, and how much ammonium ion is contained in the aqueous solution, the concentration of magnesium ion may be adjusted accordingly. The invention is founded on the discovery that magnesium ion will alleviate or reduce the phytotoxic damage of ammonium ion-containing fertilizers, even when added in small amounts. Usually at least about 0.1, preferably about 0.1 to about 15 percent, by weight, magnesium ion is provided in the solution.

The useful fertilizers may be produced by combining a water-soluble magnesium compound and the ammonium ion-containing compound with water, stirring and heating the combined ingredients to an elevated temperature, e.g. about 130° F., until a clear solution is obtained, and cooling the solution to room temperature.

The preferred compositions have a cloud point, defined as the temperature at which the solution starts to become cloudy, of less than about 50° F., preferably less than about 45° F. They also should have a clearing point (defined as the temperature upon heating at which a cloudy composition becomes clear) of less than 65° F., preferably less than 60° F. The compositions should also be sufficiently freeze-thaw stable to withstand at least two complete cycles without becoming unstable.

Phytotoxicity is a relative term which relates both the deleterious activity of a composition applied to plants and the resistance of the plant to that composition. Some plants are very resistant to phytotoxic "burn." Other plants, however, such as legumes are much less resistant. Therefore, the method of the instant invention includes foliarly fertilizing legumes and other sensitive plants with an aqueous fertilizer comprising ammonium ion as at least one source of nitrogen (including foliar fertilizers wherein ammonium ion comprises a minor portion of said nitrogen source) and contacting the plant foliage with magnesium ion in an amount sufficient to minimize the phytotoxic effect of the ammonium ion. Broadly, the instant composition and method may be used to fertilize essentially all field and row crops. Illustrative field and row crops include beets, soy beans, alfalfa, strawberries, lettuce, corn, citrus, grapes, cotton, grain crops, deciduous fruit trees, such as pears and apples, and the like.

The ability of any crop to withstand foliar application of a given fertilizer solution at a given dosage rate can be determined by a series of tests in which this solution is applied to the crop at different per acre dosage levels. The best combination for the given crop in a given set of circumstances, e.g., weather conditions, irrigation schedule, etc., can then be determined by selecting the most economically viable dosage rates that produce an acceptably low phytotoxic reaction, if any. Preferably, the phytotoxic burn should be substantially minimized, i.e., limited to less than 5 percent. More preferably, the phytotoxic burn should be substantially eliminated, i.e., reduced to a level which is insignificant or undetectable against the background, i.e., untreated crop in the same area.

The fertilizer solutions can be applied directly to plant foliage by spraying techniques known in the art. For example, aerial spraying from helicopter or other aircraft, hand spraying, or mechanical spraying from land vehicles etc., utilizing conventional spraying equipment are suitable. Fertilizers dosage rates are usually at least about 10 lbs., preferably at least about 20 lbs. of elemental nitrogen per acre, and at least about 0.8 pound of nitrogen per 1,000 square meters of foliage surface. Application temperature should be sufficient to maintain all ingredients in solution and thus avoid plugging of the spraying equipment. It is also desirable to provide sufficient foliage coverage and adequate fertilizer distribution while avoiding substantial drainage to the ground. Drainage to the ground can result in contamination of ground water and adjacent rivers and streams and provides less fertilizer benefit to the plant.

The application should provide sufficient magnesium ion to produce an acceptably low phytotoxic reaction. In the case of legumes, at least about 0.01 lb. of magnesium ion per lb. of nitrogen, in the form of ammonium ion, is usually employed. Preferably at least about 0.02 lb., and most preferably at least about 0.05 lb. of magnesium ion per lb. of ammonic nitrogen is employed, particularly with legumes. Other plants less sensitive to ammonium ion require lower ratios of magnesium ion to ammonium ion.

The fertilizer solutions may contain other components including micronutrients, insecticides, fungicides, selective herbicides and surfactants. A minor amount of surfactant assures adequate wetting of the sprayed foliage. The micronutrients are well known in the art and include iron, molybdenum, manganese, copper, boron, and zinc. They are preferably incorporated as water soluble salts at concentrations corresponding to 0.01 to about 5 weight percent of the metal. Suitable compounds include the sulfates, nitrates, phosphates, halides and the like, although the halides are less preferred in some cases due to their phytotoxicity.

Macronutrients such as potassium can be added to the solutions in conventional forms, such as water-soluble potassium salts. Concentrations of added potassium may correspond to about 2 to about 20, preferably about 2.5 to about 10 weight percent of the solution determined as $K_2O$. Phosphate requirements can also be supplied as water-soluble phosphorus compounds, such as ammonium or potassium orthophosphates, pyrophosphates, tripolyphosphates, and the like.

The above general description of applying foliar fertilizers containing both ammonium and magnesium, and the described dosage and ratios of ammonium ion to magnesium ion, are also applicable to methods involving separate application of magnesium ion and ammonium ion. While a single application of ammonium and magnesium ion is usually more economical, it has unexpectedly been discovered that separate application of magnesium ion, prior to the application of ammonium ion, results in less phytotoxic damage.

The invention is further illustrated by the following example which is illustrative of a specific mode of practicing the invention and is not intended as limiting the scope of the appended claims.

EXAMPLE

A twelve treatment, four replicate experiment is carried out on mature alfalfa. Each treatment consists of the foliar application of an aqueous ammonium phosphate solution (10-34-0), by means of a back-pack sprayer, to provide a spray volume of 80 gallons per acre. The nitrogen rate is adjusted to 10, 20, 40 and 60 lbs. per acre by varying the concentration of ammonium phosphate in the spray solution. Each rate of nitrogen treatment if further divided into treatments comprising the application of 0.05 lb. of magnesium ion per lb. of ammonium ion and a control (ammonium phosphate solution, only). The magnesium ion is applied as (a) a 2.5 percent, by weight, magnesium sulfate solution codissolved with the ammonium phosphate spray solution, and (b) a 25 percent, by weight, magnesium sulfate solution applied 24 hours prior to the ammonium phosphate spray solution.

Each treatment is replicated four times in a randomized block design. The results are summarized in the Table below in terms of the 'Burn' Index which is equal to the log of the fraction of the leaf area that is damaged. The result reported in the Table show that magnesium ion prevents or minimizes the phytotoxicity of the ammonium phosphate spray solution. Moreover, at rates of 20 lbs. of nitrogen and higher, the differences in the 'Burn' Index between the control and the magnesium ion treatments is at least 0.5 and as much as 6 units. Also, it is clear that pretreatment with magnesium ion reduces leaf burn more effectively than does the simultaneous treatment.

TABLE

| Replication | 10 lbs. N/Acre | | | 20 lbs. N/Acre | | | 40 lbs. N/Acre | | | 60 lbs. N/Acre | | |
|---|---|---|---|---|---|---|---|---|---|---|---|---|
| | Control | (b) | (a) | Control | (b) | (a) | Control | (b) | (a) | Control | (b) | (a) |
| 1 | 1.0 | 1.0 | 1.0 | 1.5 | 1.0 | 1.0 | 4.5 | 1.0 | 1.0 | 8.0 | 1.5 | 2.0 |
| 2 | 1.5 | 1.0 | 1.0 | 1.5 | 1.0 | 1.0 | 3.5 | 1.5 | 1.0 | 8.0 | 2.0 | 2.5 |
| 3 | 1.0 | 1.0 | 1.0 | 2.0 | 1.0 | 1.0 | 4.0 | 1.5 | 1.5 | 7.0 | 2.0 | 1.5 |
| 4 | 1.5 | 1.0 | 1.0 | 1.5 | 1.5 | 1.0 | 5.0 | 2.0 | 1.0 | 9.0 | 2.5 | 1.5 |
| Mean | 1.25 | 1.0 | 1.0 | 1.62 | 1.12 | 1.0 | 4.25 | 1.5 | 1.12 | 8.0 | 2.0 | 1.88 |

(b) Ammonium phosphate plus 0.05 lb. magnesium ion per pound of ammonium ion.
(a) Magnesium ion applied 24 hours before ammonium phosphate.

While particular embodiments of the invention have been described, it will be understood, of course, that the invention is not limited thereto since many obvious modifications can be made, and it is intended to include within this invention any such modification as will fall within the scope of the added claims.

Having now described the invention, I claim:

1. A method for foliary fertilizing field and row crops with nitrogen source which comprises applying an aqueous ammonium ion-containing solution to the foliage of said crops, said solution comprising ammonium ion at a concentration phytotoxic to said field and row crops corresponding to at least about 1 weight percent nitrogen as a water-soluble ammonium compound, and contracting the foliage of said crops with magnesium ion in an amount corresponding to at least about 0.01 pound of magnesium ion per pound of ammonium ion sufficient to substantially eliminate the phytotoxic effect of said ammonium ion on said field and row crops.

2. The method defined in claim 1 wherein said magnesium ion is contacted with the foliage of said crops as an aqueous solution, and said ammonium ion-containing solution is applied to said foliage at a rate of at least about 10 pounds of nitrogen per acre.

3. The method define in claim 2 wherein said aqueous ammonium ion-containing solution is applied to said foliage at a rate of at least about 20 pounds of nitrogen per acre.

4. The method defined in claim 1 wherein said nitrogen source consists essentially of said ammonium compound and said solution comprises at least about 0.05 pound of magnesium ion per pound of ammonium ion.

5. The method define in claim 1 wherein said ammonium compound comprises ammonium phosphate, and the source of said magnesium ion in said solution comprises magnesium sulfate.

6. The method define in claim 1 wherein said field and row crops are selected from the group consisting of beets, soy beans, alfalfa, strawberries, lettuce, corn, citrus, grapes, cotton, grain crops and deciduous fruit trees.

7. A method for foliarly fertilizing legumes which comprises applying to the foliage of said legumes an aqueous solution comprising ammonium ion in a concentration phytotoxic to legumes and corresponding to at least about 1 weight percent nitrogen as a water-soluble ammonium compound, and at a least about 0.01 pound of magnesium ion per pound of said ammonium ion sufficient to substantially eliminate the phytotoxic effect of said ammonium ion when said solution is applied to the foliage of said legumes, and wherein said solution is applied to said legumes at a dosage rate corresponding to at least about 10 pounds of nitrogen per acre.

8. The method defined in claim 7 wherein said aqueous solution is applied to the foliage of said legumes at a dosage rate corresponding to at least about 20 pounds of nitrogen per acre.

9. The method defined in claim 7 wherein said aqueous solution comprises a nitrogen source consisting essentially of said ammonium ion, said ammonium ion is present as an ammonium salt, and said magnesium ion is present at a concentration of at least about 0.05 pound magnesium ion per pound of ammonium ion.

10. The method defined in claim 7 wherein said ammonium ion is present as ammonium phosphate, and said magnesium ion is present as magnesium sulfate.

* * * * *

UNITED STATES PATENT AND TRADEMARK OFFICE
CERTIFICATE OF CORRECTION

PATENT NO. : 5,199,967
DATED : April 6, 1993
INVENTOR(S) : Donald C. Young

It is certified that error appears in the above-identified patent and that said Letters Patent is hereby corrected as shown below:

Column 6, claim 1, line 34, after "with" insert -- a --.

Column 6, claim 1, line 40, replace "contracting" with -- contacting --.

Column 6, claim 3, line 50, replace "define" with -- defined --.

Column 6, claim 5, line 58, replace "define" with -- defined --.

Column 6, claim 6, line 62, replace "define" with -- defined --.

Signed and Sealed this

Eleventh Day of April, 1995

Attest:

BRUCE LEHMAN

*Attesting Officer*   *Commissioner of Patents and Trademarks*